July 8, 1952 G. O. SMITH 2,602,521

MULTIPLE SHEET EXPANDED METAL AIR FILTER

Filed Sept. 21, 1950

*INVENTOR.*
GLENN O. SMITH
BY Roger C. Johnson
ATTORNEY

Patented July 8, 1952

2,602,521

UNITED STATES PATENT OFFICE 2,602,521

MULTIPLE SHEET EXPANDED METAL AIR FILTER

Glenn O. Smith, Moline, Ill., assignor to Smith Filter Corporation, Moline, Ill., a corporation of Illinois Application September 21, 1950, Serial No. 186,085

1 Claim. (Cl. 183—70)

The present invention relates generally to filters and more particularly to filters designed to remove dust, dirt and the like from air, as in air conditioning systems, and to filters adapted for use in kitchen ventilating systems or the like where it is desired to remove grease and the like from the vapors exhausted into the discharge ducts so as to reduce the fire hazards.

The object and general nature of my invention is the provision of a filter formed of several layers of expanded metal sheets, preferably aluminum, so constructed and arranged that the expanded metal sheets having the largest openings are disposed at the intake side of the filter and the other sheets having smaller openings are so disposed that the openings progressively decrease in size toward the discharge side of the filter.

An additional feature of this invention is the provision of a filter for removing grease and the like from grease-laden gases and vapors before passing them into the associated discharge ducts, in which the filter elements are formed of aluminum or other metal of high heat conductivity, whereby in the case of fire the heat will be dissipated sufficiently to prevent combustion of any gases or vapors beyond the filter.

A further feature of this invention is the provision of a filter having layers of expanded metal sheets, each sheet being so constructed that at least certain of the edges of each opening are roughened or drawn out into a multiplicity of small points which serve to entrap and remove dust and the like from the air passing through the filter. Also, such roughened, pointed or serrated edges serve to entrap grease particles and the like from grease-laden vapors passed through the filter.

It is an additional feature of this invention to so shape the mesh of the expanded metal sheets as to form a plurality of small pockets or dust-catching depressions which act to trap dust, soot, pollen, grease particles and the like. A filter constructed in this way is admirably adapted to be used without the usual coating of oil or other viscous material, termed a dry filter, especially when removing grease particles or the like. Thus, the present filter may be used as a dry filter, in which the pockets and roughened edges mechanically strain or screen out dust and dirt particles or the like, or as a viscous filter in which a multiplicity of small pockets and sharpened or feathered edges materially increase the oil-holding capacity of the filter, and hence also its dust-holding capacity so that the filter does not have to be cleaned or renewed as often as ordinary filters.

An additional feature of this invention is the provision of a filter having both the frame and the filter elements of the same metal, such as aluminum, preferably, so that the filter is not affected by water or humidity in the air passing through the filter, nor is the unit subject to corrosion due to electrolysis resulting from the action of dissimilar metals in the presence of moisture.

Still further, an additional feature of this invention is the provision of a filter having its filter elements formed of expanded metal or the like having a plurality of corrugations, which serves to increase the lint-holding capacity of the filter without liability of the filter becoming clogged or loaded up with such airborne particles as lint and the like.

Also, it is an important feature of this invention to so arrange the sheets or filter elements that the corrugations of each sheet are transverse with respect to adjacent sheets, thereby providing adequate space between the filtering surfaces to secure a very low resistance to air flow through the unit.

These and other objects of the present invention will be apparent to those skilled in the art after a consideration of the following detailed description, taken in conjunction with the accompanying drawings which illustrate the presently preferred form of the invention.

In the drawings:

Figure 1 is a face view of an air filter in which the principles of the present invention have been incorporated.

Figures 2 and 3 are enlarged fragmentary sectional views, somewhat diagrammatic in nature, taken along the lines 2—2 and 3—3 of Figure 1.

Figure 1:
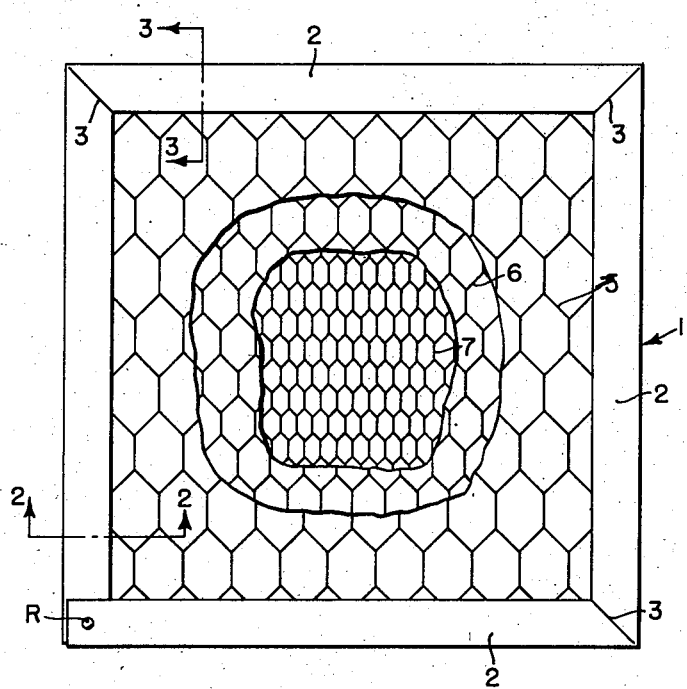
Figure 2:
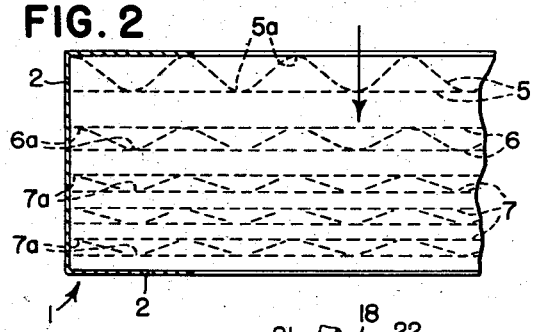
Figure 3:
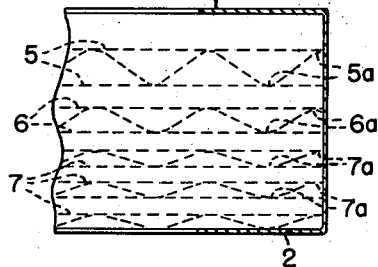

Referring first to Figure 1, the filter incorporating the principles of this invention is shown as having a frame 1 formed of channel stock with the flanges 2 cut so as to permit folding the sections into a box-like form, the slitted flange portions being indicated at 3. The frame 1 encloses a plurality of expanded metal sheets formed of aluminum stock, there being, in one form of the invention as presently practiced, two sheets or elements 5 having ½ inch openings, two sheets or elements 6 having ¼ inch openings, and the other sheets having ⅛ inch openings. Each of the sheets or elements 5, 6 and 7 is provided with corrugations, indicated at 5a, 6a, and 7a, respectively, and as best shown in Figures 2 and 3, the sheets 5, 6 and 7 are assembled in the frame 1 so that the corrugations of one sheet lie at right angles to the corrugations of the next adjacent sheet or sheets. After assembly, the sheets are connected together in any suitable way, as by one or more aluminum wires or the like, which materially facilitates installation of the channel frame around the filter sheets, overlapping portions of the frame channel flanges being riveted or otherwise connected to complete the frame.

Figure 4:
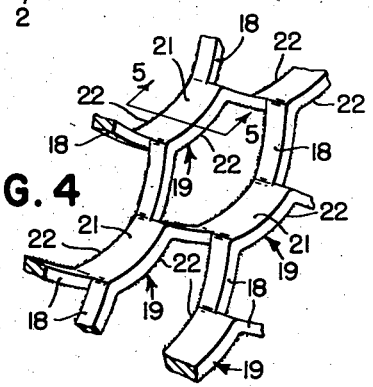
Figure 4 is an enlarged fragmentary perspective view, showing the dust-catching pockets and the sharpened edges that are produced during the process of expanding the metal sheet, of which the filter element is made, into reticulated form.
Figure 6:
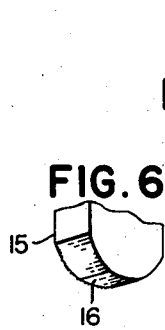
Figure 6 is a fragmentary view of a portion of the metal-expanding die.

To form the expanded metal sheets mentioned above, dies are used which produce roughened or feathered edges and pockets. One of the portions of the upper die is shown in Figure 6, in which the shearing or slitting edge is indicated at 15, the working face of the die being grooved or serrated, as shown at 16. The die face is so shaped and the serrations 16 so formed that in operation the expanded metal mesh has the form and characteristics illustrated, by way of example in Figure 4, which is enlarged several times actual size. As shown in Figure 4, the strands 18 are slightly curved and the strand-connecting bars 19 are curved or cupped, as at 21, forming the dust-catching pockets mentioned above. Additionally, the serrations 16 on the slitting and stretching dies form roughened edges on the lower side of the sheet when the die is forced threrethrough and also on the upper side of the portion of the sheet being severed from the stock. Such roughened or feathered edges are shown at 22 in Figure 4, and also in Figure 5.

In use, after the sheets or filter elements have been properly assembled and arranged in the frame 1 and the latter locked in closed position by the rivet R (Fig. 1) or the like, adhesive material, usually oil of the proper viscosity, is brushed onto the faces of the filter. This material spreads throughout the entire interior structure of the filter elements, especially adhering to the pockets 21 and roughened edges 22, whereby dust, dirt and the like in the air passing through the filter impinge on the wetted surfaces thereof and adhere thereto. Dust and the like collect on the roughened edges 22 and especially in the pockets 21 and are retained at such points until the filter becomes clogged with material and must be cleaned or renewed. It will thus be seen that the filter of the present invention has much more adhesive-retaining qualities than the ordinary wire mesh filter. Since the larger openings are at the intake side of the unit, only the larger particles, such as lint or other fibrous material, are caught by the filter elements 5 and/or 6. Finer dust, dirt, and the like, pass on into the filter and are caught by the sections having the smaller openings.

Since both the frame 1 and the filter sheets or elements are made of aluminum, the filter will not rust or corrode in the presence of humidity, or moisture, as may be encountered in washed air systems, for example.

Figure 5:
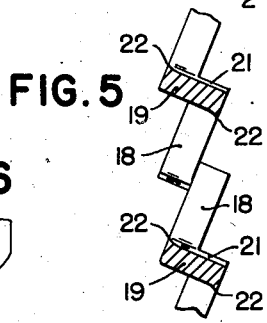
Figure 5 is a sectional view taken along the line 5—5 of Figure 4.

By virtue of the transverse corrugations formed in the filter sheets, lint and other similar material in quantities that might overload and clog ordinary flat filter elements, tend to collect in the valleys of the corrugations, leaving the crests relatively free so that the resistance to air flow through the unit and the dust-holding ability of the latter are not seriously impaired for relatively long periods of time. Since the units are of metal, they may be easily and conveniently cleaned. Preferably the filter elements are assembled so that the pockets 21 face upstream, as indicated in Figure 5.

While I have shown in the accompanying drawings and described above what is now considered to be the preferred embodiment of my invention, it is to be understood that my invention is not to be limited to the particular structure shown and described above, but that, in fact, widely different means may be utilized in the practice of the broader aspects of my invention.

What I claim and desire to secure by Letters Patent is:

A filter comprising a plurality of sheets of expanded metal having openings formed by spaced apart bars and strands interconnecting end portions of adjacent bars, each strand and bar having a generally rectangular cross section, diagonally opposite edges of said strands and said bars being formed with a multiplicity of outwardly drawn small points, forming roughened or serrated portions serving to increase the oil-holding capacity of the filter, and means holding the sheets in assembled relation.

GLENN O. SMITH.

REFERENCES CITED

The following references are of record in the file of this patent:

UNITED STATES PATENTS

| Number | Name | Date |
|---|---|---|
| 928,610 | Klocke | July 20, 1909 |
| 1,059,710 | Chess | Apr. 22, 1913 |
| 1,576,121 | Preble | Mar. 9, 1926 |
| 1,676,191 | Jordahl | July 3, 1928 |
| 1,783,143 | Schrempp | Nov. 25, 1930 |
| 2,327,184 | Goodloe | Aug. 17, 1943 |
| 2,443,238 | Glanzer | June 15, 1948 |
| 2,493,726 | O'Day | Jan. 3, 1950 |

FOREIGN PATENTS

| Number | Country | Date |
|---|---|---|
| 73,855 | Austria | Oct. 10, 1917 |